US009923916B1

(12) United States Patent
McClintock et al.

(10) Patent No.: US 9,923,916 B1
(45) Date of Patent: Mar. 20, 2018

(54) ADAPTIVE WEB APPLICATION VULNERABILITY SCANNER

(71) Applicant: Amazon Technologies, Inc., Seattle, WA (US)

(72) Inventors: Jon McClintock, Seattle, WA (US); Alun Jones, Woodinville, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 14/741,536

(22) Filed: Jun. 17, 2015

(51) Int. Cl.
G06F 11/00 (2006.01)
H04L 29/06 (2006.01)
H04L 29/08 (2006.01)

(52) U.S. Cl.
CPC .......... H04L 63/1433 (2013.01); H04L 67/02 (2013.01)

(58) Field of Classification Search
CPC ............. H04L 63/1433; H04L 63/1416; H04L 63/1466; H04L 67/02; G06F 21/577; G06F 221/033
USPC ......................................................... 726/25
See application file for complete search history.

(56) References Cited

U.S. PATENT DOCUMENTS 7,343,626 B1* 3/2008 Gallagher ............. G06F 21/577
707/999.003
7,359,976 B2 4/2008 Ross et al.
8,112,799 B1 2/2012 Loiodice et al.
8,615,804 B2 12/2013 Mui et al.
8,752,183 B1* 6/2014 Heiderich ............. G06F 21/577
726/22
8,910,247 B2* 12/2014 Andrews ............ G06F 17/3089
713/161
8,931,084 B1 1/2015 Paya et al.
9,021,593 B2* 4/2015 Liu .......................... G06F 21/53
707/999.003

(Continued)

OTHER PUBLICATIONS

Couture, "Web Application Injection Vulnerabilities—A Web App's Security Nemesis?," GIAC (GWAPT) Gold Certification, Accepted May 20, 2013, 34 pages.

(Continued)

Primary Examiner — Samson Lemma
(74) Attorney, Agent, or Firm — Davis Wright Tremaine LLP

(57) ABSTRACT

Adaptive methods and systems are provided to scan websites/Web applications for vulnerabilities. The methods and systems identify a reference string in a first response web page and an authorized context in which the reference string appears. The first response web page is generated at least in part based on the reference string. An escape attempt input is determined based on the reference string and authorized context, and the escape attempt input is present to the website. The methods and systems identify an escape attempt input in a second response web page and a candidate context in which the escape attempt input appears, wherein the second response web page is generated at least in part based on the escape attempt input. The methods and systems determine when the escape attempt input appears in an un-authorized context in the second response web page. The adaptive methods and systems herein, efficiently identify website vulnerabilities, and thus may be run frequently, thereby resulting in improved security without excessively drawing upon website resources.

16 Claims, 7 Drawing Sheets

(56) References Cited

U.S. PATENT DOCUMENTS

| | | | |
|---|---|---|---|
| 9,032,519 B1 | 5/2015 | Maher et al. | |
| 9,223,977 B2* | 12/2015 | Amit | G06F 21/52 |
| 2011/0321164 A1* | 12/2011 | Saxena | G06F 21/577 |
| | | | 726/25 |
| 2012/0090026 A1 | 4/2012 | Andrews et al. | |
| 2013/0090026 A1 | 4/2013 | Orselli | |
| 2013/0191920 A1* | 7/2013 | Amit | H04L 63/166 |
| | | | 726/25 |
| 2013/0227640 A1* | 8/2013 | Zhou | H04L 63/1433 |
| | | | 726/1 |
| 2014/0123295 A1* | 5/2014 | Kuykendall | G06F 21/577 |
| | | | 726/25 |
| 2014/0189875 A1* | 7/2014 | Beskrovny | G06F 21/577 |
| | | | 726/25 |
| 2015/0264082 A1* | 9/2015 | Belva | H04L 63/1466 |
| | | | 726/25 |

OTHER PUBLICATIONS

Klein, "DOM Based Cross Site Scripting or XSS of the Third Kind," Web Application Security Consortium, Jul. 2005, retrieved from internet at http://www.webappsec.org/projects/articles/071105.html, pp. 1-8.

Ristic, "Protecting Web Applications from Universal PDF XSS: A discussion of how weird the web application security world has become," 6th OWASP AppSec Conference, May 2007, retrieved from internet at http://www.owasp.org/images/c/c2/OWASPAppSec2007Milan_ProtectingWebAppsfromUniversalPDFXSS.ppt, pp. 1-38.

Sharma, "Prevent a cross-site scripting attack," IBM.com, Feb. 3, 2004, retrieved from internet at http://www.ibm.com/developerworks/ibm/library/wa-secxss/, pp. 1-7.

* cited by examiner

ADAPTIVE WEB APPLICATION VULNERABILITY SCANNER

BACKGROUND

Website designers and operators such as online merchants are engaged in an ongoing battle to maintain information security. The complexity of the Internet's infrastructure is accompanied by numerous security vulnerabilities, such as Cross-Site Scripting (CSS) and other vulnerabilities. A cross-site scripting exploit may be used by an attacker to breach the security of a web browser or other web-based application. By breaching a browser's security, the attacker may gain access to a user's session at a particular website. For a user engaged in a session at the website of an online merchant, for example, a cross-site scripting exploit may permit an attacker to gain access to private information associated with the user's session, such as financial information, authentication credentials, and/or elements of the user's personal identity (e.g., a real name, an e-mail address, etc).

In particular, a cross-site scripting flaw may be exploited to enable an attacker to inject a client-side script into a web page. The client-side script may be injected into a web page sent by a server to the client without the knowledge or consent of the server's operators. When processed in the client's browser, the script may access private information stored in one or more cookies (or other storage elements) in the memory of the browser. The script may forward the stolen information to a third-party recipient for potential use in fraudulent or otherwise malicious schemes.

Cross-site scripting exploits are often placed into two categories: non-persistent and persistent. In a non-persistent or reflected exploit, data provided to a server by a client (e.g., the client's browser) may be included in a web page sent back to the client without properly sanitizing the data. The data introducing the exploit is typically provided to the client through a link to the server provided by a third party. The link may contain an injected script or any other content that is interpretable as code by the browser. When the improperly sanitized data is sent (i.e., reflected) from the server back to the client, the injected script may be executed on the client's browser. In a persistent or stored exploit, data introducing the exploit is stored by the web server and provided by the server to the client that requests a particular web page. The data may include a script that is executed on the client side when provided by the server to the client. The script may be introduced into the server's web page through user-supplied content from a malicious third party. Whether the script is sent to the client using the non-persistent or persistent type of exploit, execution of the script on the client side may result in sensitive information being stolen and/or misused.

Web application vulnerability scanners typically scan for CSS and other vulnerabilities by attempting a large list of previously successful exploits in connection with the user supplied parameter (also referred to as an input element) associated with the URL identifying the webpage or parameter list. Accordingly, conventional Web application vulnerability scanners are not particularly smart and frequently will attempt multiple (e.g. hundreds) exploits, even though such exploits are predicted to fail based on previous checks of the current webpage and/or other webpages.

Hence, conventional Web application vulnerability scanners place a large strain on a Web server, by attempting numerous exploits. Also, due to the volume of potential exploits, a vulnerability scan may require a relatively long period of time to be completed. Consequently, web vulnerability scanners are run infrequently and typically only run on test systems. Web vulnerability scanners are generally not run on production environment Web sites and/or Web applications.

In addition, conventional Web application vulnerability scanners may return numerous "false positives" indicating apparent exploits. However, when these apparent exploits are further analyzed, it may turn out that some of the apparent exploits are not in fact actual vulnerabilities. Instead, other methods operating on the Web server (or elsewhere) may ultimately prove to appropriately quarantine some of the apparent exploits.

Accordingly, it is desirable for website operators and designers to have techniques for detecting and/or remediating vulnerabilities in an adaptive manner that performs vulnerability scans more efficiently and with less demand on web server resources.

Figure 1:
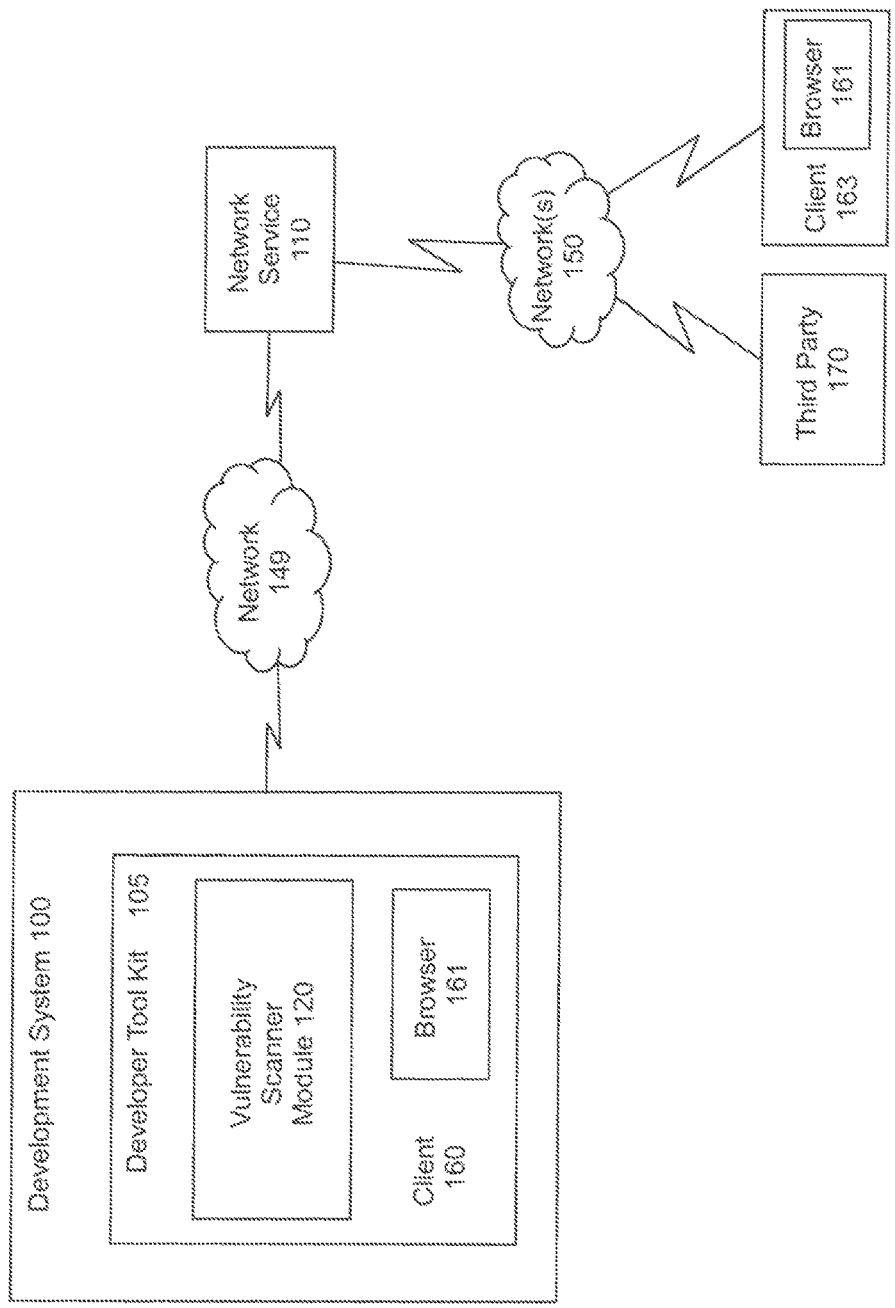
FIG. 1 illustrates an example system environment for protecting websites from injection vulnerabilities in accordance with embodiments herein.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

The news today frequently refers to Internet related security breaches, such as in connection with identity theft and the like. In addition, users of computing devices (whether it be a desktop or laptop computer, smart phone, tablet device or otherwise) are constantly exposed to and concerned with obtaining viruses, malware, etc. on their computing devices, that may ultimately shut down their local computing device and/or propagate across a wider network. Accordingly, businesses and individuals invest a significant amount of resources attempting to avoid Internet related exposure or "vulnerability" to attacks from hackers, malware, identity thieves and numerous other types of malicious actions. In an attempt to limit exposure to third-party attacks, website developers and e-commerce merchants analyze websites and Web applications in an attempt to identify manners in which the websites and Web applications are exposed to third-party attacks.

Methods and systems are described that provide an adaptive vulnerability scanner for network services. Examples of network services are websites, and Web applications (collectively and interchangeably referred to hereafter as websites and/or Web application). The adaptive vulnerability scanners described herein generally involve providing a user supplied input to a parameter or input field of a network resource, such as a webpage, searching a response provided from the network resource for the input, and determining what character sequences potentially could be entered into the parameter that would enable a third-party to "hack" the network resource or network service. For example, unless appropriate protective measures are in place, an attacker could potentially gain unauthorized access to a Web server through a login page (e.g., at a financial institution or other e-commerce business). For example, the hacker could enter certain character sequences in place of a user ID or password that the Web server misinterprets as another type of command, such as a script to be implemented by the Web server or by the client computer.

Embodiments herein seek to identify potential character sequences that may be used to improperly access a network service, and inform an appropriate administrative user regarding how to correct the potential breach. The potential character sequences used to improperly access the Web server are generally referred to herein as "escape attempts" or "escape attempt inputs" as such character sequences seek to escape out of a predetermined context (e.g., authorized context) in which inputs are intended to be entered into the webpage (e.g., user ID or password). Embodiments herein seek to efficiently identify escape attempt inputs through which breaches may occur, in order to limit the demand upon network service resources. Potential exploits are efficiently derived from prior inputs to the website, where such prior inputs represent safe character strings expected to be properly processed by the network service. For example, safe character strings are entered and returned webpages are analyzed to derive the proper (authorized) context in which the safe character strings are processed. From one or more safe character strings and authorized context combinations, the systems and methods herein intelligently determine particular character strings to use as attempted exploits.

After the attempted exploit (escape attempt input), the returned network resource is analyzed to determine whether the exploit was successful in breaching the network service, namely whether the network service improperly processed the input. A network service breach is identified when the escape attempt input is returned in the resource as an unauthorized type of element on the resource. As a simple example, a vulnerability may exist when an input string is entered into the user ID field, but returned in a responsive resource as a script to be processed by the client computer.

Once vulnerabilities are identified, various corrective actions may be taken, such as informing a network developer or other administrative person responsible for the network service. By utilizing adaptive processes, network service vulnerabilities can be efficiently identified, and thus may be run frequently, thereby resulting in better security without excessively drawing upon resources.

It is recognized, that while the terms "webpage", "website", "web application", "Web server" and other similar terms are used throughout in connection with explaining various embodiments, the principles and aspects described herein are not limited to web-based pages, sites, applications and servers. Instead, the principles described herein extend to other types of structured networks and generally applied to any network service or network resource that receives user inputs as parameters and returns resource content to the user.

FIG. 1 illustrates an example system environment for protecting network services from injection vulnerabilities, according to embodiments herein. The example system environment comprises a development system 100. The development system 100 may include various components such as a developer toolkit 105 that is communicatively coupled to a network service 110 through a network 149. In various embodiments, the developer toolkit 105 may be separate from the network service 110 or combined with the network service. For purposes of illustration, the developer toolkit 105 is depicted as separate from the network service 110 in FIG. 1 and coupled through network 149. The development system 100 may comprise one or more computing devices, any of which may be implemented by the example computing devices illustrated and described herein. In various embodiments, the functionality of the different components may be provided by the same computing device or by different computing devices. Additionally or alternatively, the vulnerability scanner module 120 may represent a remote computing service, such as offered in a collection of remote computing services that form a cloud computing platform. As one example, the collection of Web services may represent the web services offered by Amazon Web Services, Inc. The functionality of the vulnerability scanner module 120 may be implemented, as a remote computing service, for various subscribers, such as e-commerce businesses, to scan various network services offered by the e-commerce businesses for vulnerabilities.

In one embodiment, the development system 100 and its components may be managed by a website developer, an online merchant, a website management service and the like. For example, one or more client computing device 160 may be provided within or communicate with the development system 100 over one or more networks 149 (e.g., the internet). The client computing device 160 may utilize the developer toolkit 105 to build web pages from the various available components (e.g., images, video, audio, scripts, etc.). The webpages, while being built and thereafter may be presented on the client computing device 160 through browser 161. The browser 161 (and developer toolkit 105) may comprise any suitable set of program instructions executable to receive web data and render web pages based on the web data. Web pages may be generated in accordance with a markup language such as HTML (HyperText Markup Language).

In accordance with embodiments herein, the developer tool kit 105 includes a vulnerability scanner module 120 that is utilized to test webpages, websites, Web applications, etc. for various vulnerabilities that may arise from third-party injection attacks. The vulnerability scanner module 120 may be utilized throughout development of a network service or resource, such as a webpage, website or Web application, or may be used upon completion of a test or prototype webpage, website, Web application. Additionally or alternatively, following completion, the vulnerability scanner module 120 may be utilized intermittently or periodically throughout operation of a production webpage, website or Web application. The vulnerability scanner module 120 may perform scans in connection with static or dynamic webpages, websites and Web applications.

The network service 110 may generate elements of a web page dynamically, e.g., upon request from a client browser 161. In generating a web page, the network service 110 may retrieve elements of web pages from storage. The network service 110 may host one or more web servers under a domain such as "example.com." Individual ones of the web servers may be hosted at related addresses within the same domain, e.g., "server-1.example.com" and "server-2.example.com." In one embodiment, different ones of the web servers may be tasked with providing different types of data to client browsers. For example, one set of web servers may provide textual elements of web pages, and another set of web servers may provide images referenced in the web pages.

When the vulnerability scanner module 120 identifies potential vulnerabilities, a report and recommendation are provided to a user, administrator, developer or other personnel. The report and recommendation includes various information, such as information identifying the vulnerability and information characterizing a nature of the vulnerability. The report and recommendation may also include information recommendations regarding how to sanitize or remove the vulnerability.

As used herein, the terms vulnerability, exploit and injection attack generally refer to aspects of a webpage, website or Web application that permit a third-party to interact with the network service 110 and/or clients utilizing the network service 110, in a manner that is unauthorized and unintended by the developer, manager, operator or other entity responsible for or associated with the webpage, website or Web application.

For example, a computer system 170 (also referred to herein as a third party 170) may be in communication with the network service 110 (e.g., over the network(s) 150, directly connected via a communications port and the like). The third-party computer system 170 may be managed by a third party that seeks to use an injection attack, such as cross-site scripting, to gain illegitimate access to private information associated with client computers 163 and/or the network service 110. The private information may comprise financial information, authentication credentials, elements of the user's personal identity (e.g., a real name, an e-mail address, etc.), and/or any other information stored using the client computers 163 and/or browser 161 that is not intended to be available to the third party. Additionally, the third-party computer system 170 may exploit a vulnerability to collect anonymous usage statistics. The third-party computer system 170 may comprise a web server, an e-mail server, a web client, or any other suitable computer system for exploiting a cross-site scripting flaw to access the client's information.

In accordance with embodiments, the vulnerability scanner 120 may be utilized to probe production stage network services that are in commercial operation. For example, the vulnerability scanner 120 may periodically check websites for third-party exploits, such as to identify any scripts or any other sets of instructions that have been impermissibly installed by the third party 170 as an attack. As used herein, the term "script" may refer to a script tag or any reference invoking a set of instructions. When vulnerabilities are identified, the scanner 120 may perform automatic actions to sanitize the vulnerability. Additionally or alternatively, the scanner 120 may inform an administrative person of the vulnerability, along with recommended corrective actions. For example, the scanner 120 may automatically (or provide a recommendation to) escape a third-party script in a resource (e.g., web page) by encoding the script (e.g., using an HTML comment) so that it will not be automatically executed in the browser 161. Optionally, a third-party script may be removed entirely from a web page. In one embodiment, when an exploit is not readily removable, the resource (e.g., web page) containing the exploit (e.g., a third-party script) may be quarantined or otherwise taken off-line until sanitized. Optionally, an alternative page or a redirect link may be utilized in place of the quarantined resource. The use of the development system 100 to protect network services is discussed in greater detail below.

Figure 2:
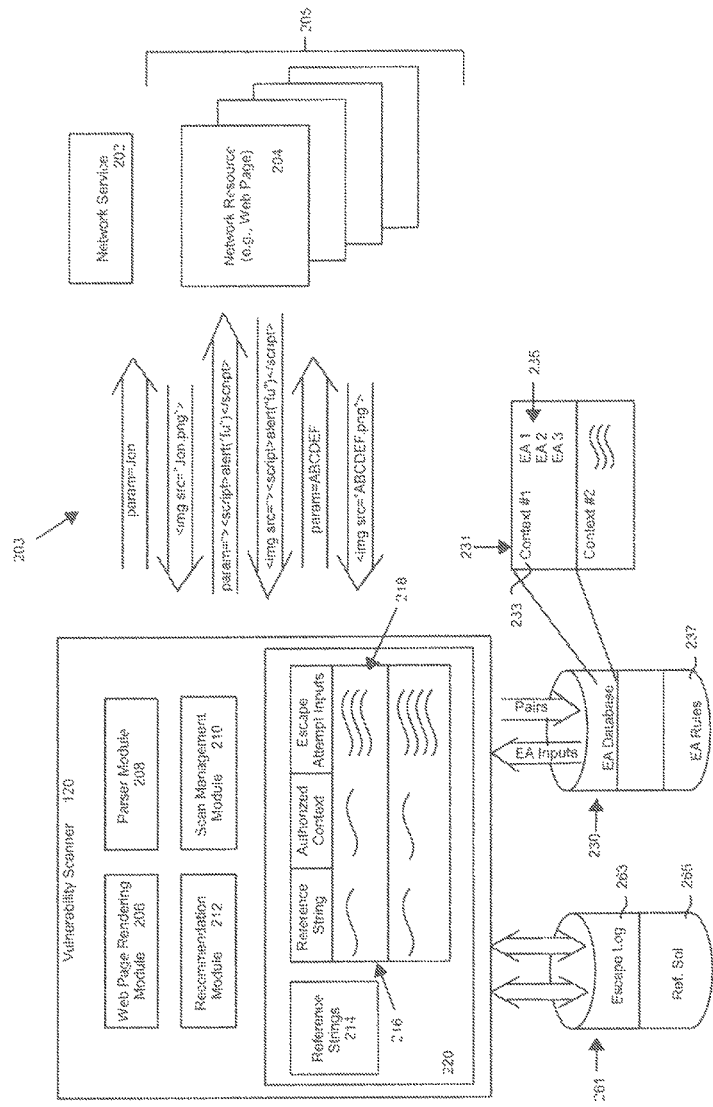
FIG. 2 illustrates a block diagram of the modules forming the vulnerability scanner in accordance with embodiments herein.

FIG. 2 illustrates a block diagram of the modules forming the vulnerability scanner 120 in accordance with embodiments herein. The vulnerability scanner 120 interacts with a network service 202 to probe a target web site 205. The vulnerability scanner 120 includes a webpage rendering module 206, a parser module 208, a scan management module 210, and a recommendation module 212. The vulnerability scanner 120 includes (or is communicatively coupled) to memory 220 which stores various data, information, computer readable instructions and the like. For example, the memory 220 stored reference strings 214 that are used on the target website 205.

FIG. 2 also illustrates examples of a portion of the content 203 passed between the vulnerability scanner 120 and network service 202.

The scan management module 210 manages entry of safe test inputs (reference strings) 214 to the network resource 204. In response thereto, the target website 205 returns a (first response) network resource 204 with the reference string presented within an authorized context (e.g. a string context). The scan management module 210 analyzes the resultant content returned within the network resource 204 (first response). For example, the reference string 214 may be "param=Jon" passed to the network service 202, and the network resource 204 that is returned may include the code <imgsrc="jon.png">. The scan management module 210 identifies the context in which the reference string is returned and saves the reference string 214 and context as a reference—context pair 216.

While the term "reference string" is used throughout in connection with describing content supplied to a network service that is being tested for vulnerabilities, it is understood that the context of the "reference string" is not limited to string context. Instead, the reference string may represent other contexts, such as images, scripts, blocks, URLs and the like.

The contexts, in which content of interest appears, are identified by the parser module 208. The parser module 208 includes one or more parsers configured to parse through code defining the network resource 204 while searching for various content of interest, such as reference strings and escape attempt inputs. Throughout, the present description shall refer to reference strings and escape attempt inputs as being "returned" or "located" within webpages. However, it is to be recognized that the returned content may not be identical to the original content forming the reference string or escape attempt input. Instead, the returned content may represent a string, script, image or other element that corresponds to the original reference string, script, image or other escape attempt input, although not identical thereto. For example, a reference string may represent a name (e.g. user ID) presented to a website 205, with the response webpage returning an image corresponding to the name/user ID. The parser module 208 searches for returned content (e.g., image or script) returned within the network resource 204 that is associated with the reference string, escape attempt input, etc. By way of example, the parser module may include one or more parsers, such as an HTML parser, a Google Chrome parser and the like. Other non-limiting examples or parsers include: HTML Agility Pack, Gumbo, isdom, isoup, JTidy, Tagsoup, and HTMLCleaner.

The scan management module 210 identifies the context in which the reference string is returned in the network resource 204. Given that the reference string 214 is expected to be a safe string that should remain within the intended context, the context identified by the scan management module 210, in connection with a reference string, is assigned to be an "authorized" context. The scan management module 210 builds reference—context pairs 216 from the reference string and returned authorized context. The reference—context pairs 216 are stored in the memory 220 as a list forming a map, also referred to as a parameter to context map.

The scan management module 210 also adaptively identifies escape attempt inputs 218 to be applied to the network resource 204. The escape attempt inputs 218 are identified based on the reference—context pairs 216 as explained below in more detail. The scan management module 210 identifies and adds one or more escape attempt inputs 218 in connection with the reference—context pair 216. The escape attempt (EA) inputs 218 are determined by the scan management module 210 as potential vulnerabilities in the network resource 204. For example, the EA input 218 may be determined to be: param="><script>alert("fu")</script>, or param=ABCDEF which is passed to the network service 202. In response, the network resource 204 that is returned may include the code: <img src=""><script>alert("fu")</script> or <img src=""><script>alert("fu")</script>. The scan management module 210 applies the escape attempt inputs 218 to the website 205 and analyzes the returned (candidate) webpages to determine whether the escape attempt inputs 218 have "escaped" from the intended/authorized context.

It is recognized that numerous types of test strings may be adaptively used. For example, a simple test string may merely represent one or more quotes (e.g., " "). Optionally, the test string may include one or more quotes appended to a username (e.g. Jon " "). Also, it is recognized that various types of return context may be used. The example of FIG. 2 shows an image source element returned. Other non-limiting examples of return elements are a script, header, body, paragraph, blocks, URLs and an empty element.

Optionally, the reference string and/or returned portion of the webpage may represent nested elements, such as a string nested within a script, an image nested within a script, one script nested within another script, and the like.

The scan management module 210 maintains an escape log as a list of vulnerability items. When EA inputs 218 escape from an authorized context into an unauthorized context, the scan management module 210 updates the escape log to add a vulnerability item corresponding to the escaped EA input and unauthorized context. The vulnerability item includes, among other things, a successful escape attempt input 218, the corresponding unauthorized context and other information that may be of interest or useful to sanitize or otherwise overcome the vulnerability.

The recommendation module 212 analyzes vulnerability items and seeks to obtain corrective actions to recommend to the user. The recommended corrective actions, as well as other information regarding the vulnerability items, are organized by the recommendation module 212 into a vulnerability report. For example, the recommendation module 212 may compare a vulnerability item to known injection attacks recorded and saved in a reference solution database. Additionally or alternatively, the recommendation module 212 may automatically determine a recommended corrective action by analyzing information such as the escape attempt input, the unauthorized context, surrounding portions of the code and the like. The corrective action may represent a rule to be handled at the web server. For example, select escape actions may have corresponding predetermined corrective rules that are applied at the Web server. When the recommendation module identifies one such select escape action, the recommendation module records the corresponding rule in the vulnerability report to be presented to the user. Additionally or alternatively, the recommendation module may automatically apply certain rules to the code defining the website.

Optionally, the vulnerability report may provide information indicative of potential consequences if a vulnerability is not removed/sanitized. Optionally, the vulnerability report may classify vulnerability items, such as along a sliding scale of low risk to high risk.

Additionally or alternatively, the recommendation module 212 may automatically perform certain corrective actions, such as making certain modifications to the code defining the web site. Automation of corrective actions may be appropriate in situations in which a very common vulnerability is identified that have a well-accepted solution and/or where the correction within the code is readily determinable without undue risk of incorrect recoding.

A data store 230 may be provided within memory 220 and/or communicative coupled to the vulnerability scanner 120. The data store 230 stores a blacklist or EA database 231 and rules 237. The EA database 231 may store EA inputs with corresponding reference strings, authorized contexts and/or combination thereof.

As one example, the EA database 231 stores a list of contexts 233 that may be utilized in connection with the web site or network service. The context 233 is saved in connection with one or more candidate escape attempt inputs 235. Difference contexts 233 may have a common candidate EA input 235 stored in connection therewith. By way of example a candidate context may be the string context, where the group of associated candidate EA inputs 235 includes one or more strings, scripts, images and the like. The group of candidate EA inputs 235 may be updated by users and/or automatically over time.

The EA rules 237 represent rules that are applied to generate an EA input (also referred to as an EA generation rule). The rule may be associated with a reference string, context and/or otherwise. For example, a rule may be to nest a reference string in a script context, or to append select characters to a reference string. The rule may generate various modifications of the reference string. Another example is when the returned reference context is nested within a second context, then the rule applies corresponding transformations (e.g., when returned context A is nested in returned context B, apply transformation x to the reference strings).

The vulnerability scanner 120 manages the EA inputs in the EA database 231, as well as any rules 237 that may be applied to form EA inputs. The vulnerability scanner 120 may permit the user to update the EA database 231 and rules 237 to adapt to changes and new information learned about potential vulnerabilities and types of attacks. Additionally or alternatively, the vulnerability scanner 120 may perform updates (e.g., automatically or with user intervention) based on feedback from the scan management module 210 and/or recommendation module 212 to adaptively learn from past vulnerabilities and the manner in which such vulnerabilities are addressed.

The webpage rendering module 206 is configured to render the webpages and other content from the network service 202 to be presented to the user, such as within the developer toolkit 105 (FIG. 1), on a web browser or elsewhere. The webpage rendering module 206 may be utilized when a user desires to view the network resource 204, such as during development, in connection with enabling a user to designate parameters of interest or otherwise. For example, as corrective actions are taken to sanitize vulnerabilities, such corrective actions may involve modifying the code defining one or more webpages. The webpage rendering module 206 enables the user to view the modified webpage during development.

A data store 261 maintains an escape log 263 that is built by the scanner management module 210 as explained herein. The data store 261 also stores a reference solution database 265 containing known injection attacks, along with information regarding injection attacks, such as corrective actions, further tests that may be warranted and the like. The recommendation module 212 analyzes the escape log 263 in connection with the reference solution database 265, when attempting to identify corrective actions (e.g. in connection with the operations of FIG. 6).

Figure 3:
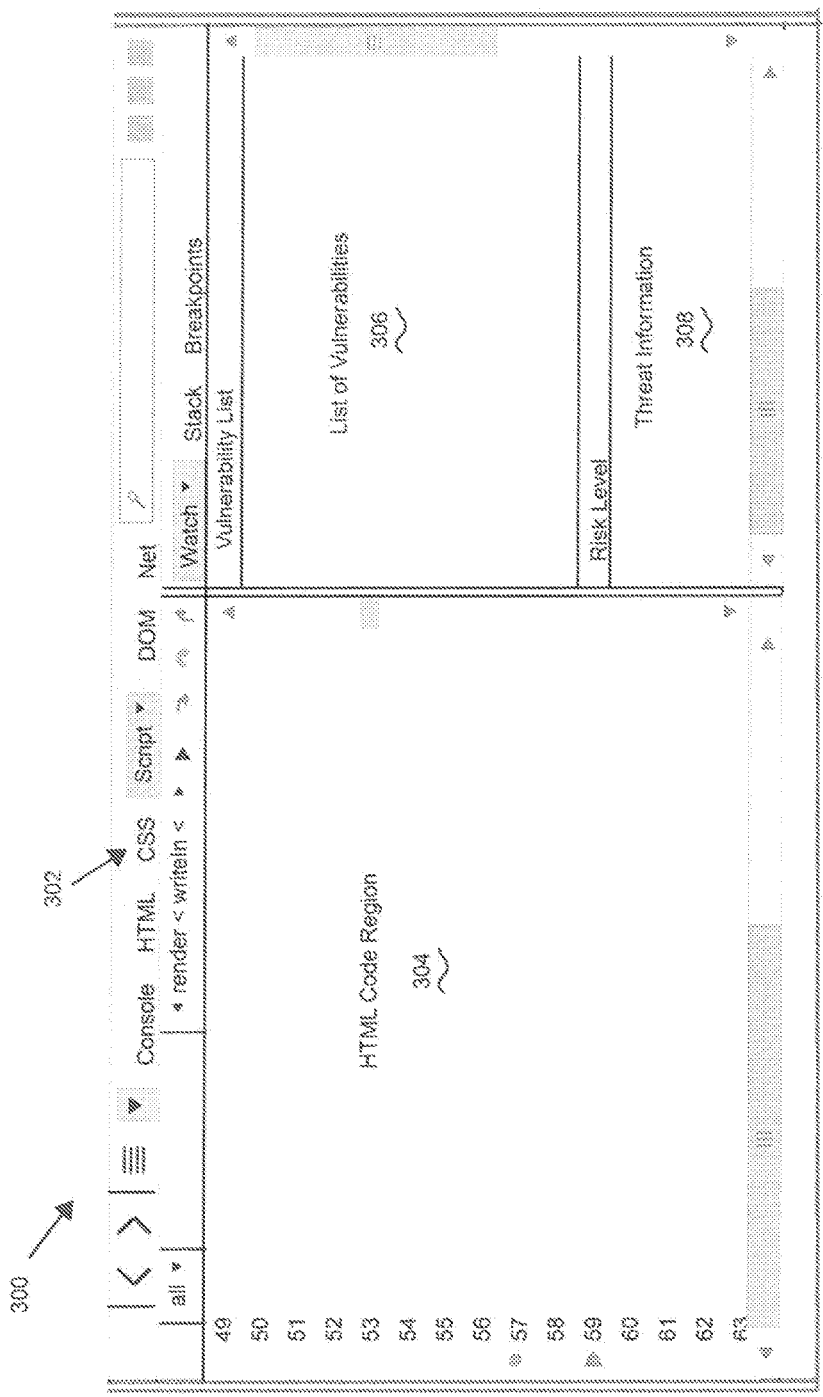
FIG. 3 illustrates an example screenshot of a user interface that may be used to present a vulnerability report to a user on a client computer in accordance with embodiments herein.

FIG. 3 illustrates an example screenshot of a user interface 300 that may be used to present a vulnerability report to a user on a client computing device 160. The user interface 300 includes user controls 302 that may be used to navigate through code, drill down to view detailed portions of the vulnerability report, implements recommended corrective actions and the like. The user interface 300 includes a code region 304 that presents the code defining the webpage or network resource. Region 306 presents the list of vulnerability items. When a user selects a vulnerability item from the list, the corresponding webpage code may be tagged and presented in region 304. Region 308 may be utilized to present additional information regarding particular threats. For example, the region 308 may provide a level of risk associated with individual vulnerabilities, as well as comments informing the user of potential consequences if a particular vulnerability is left uncorrected.

Figure 4:
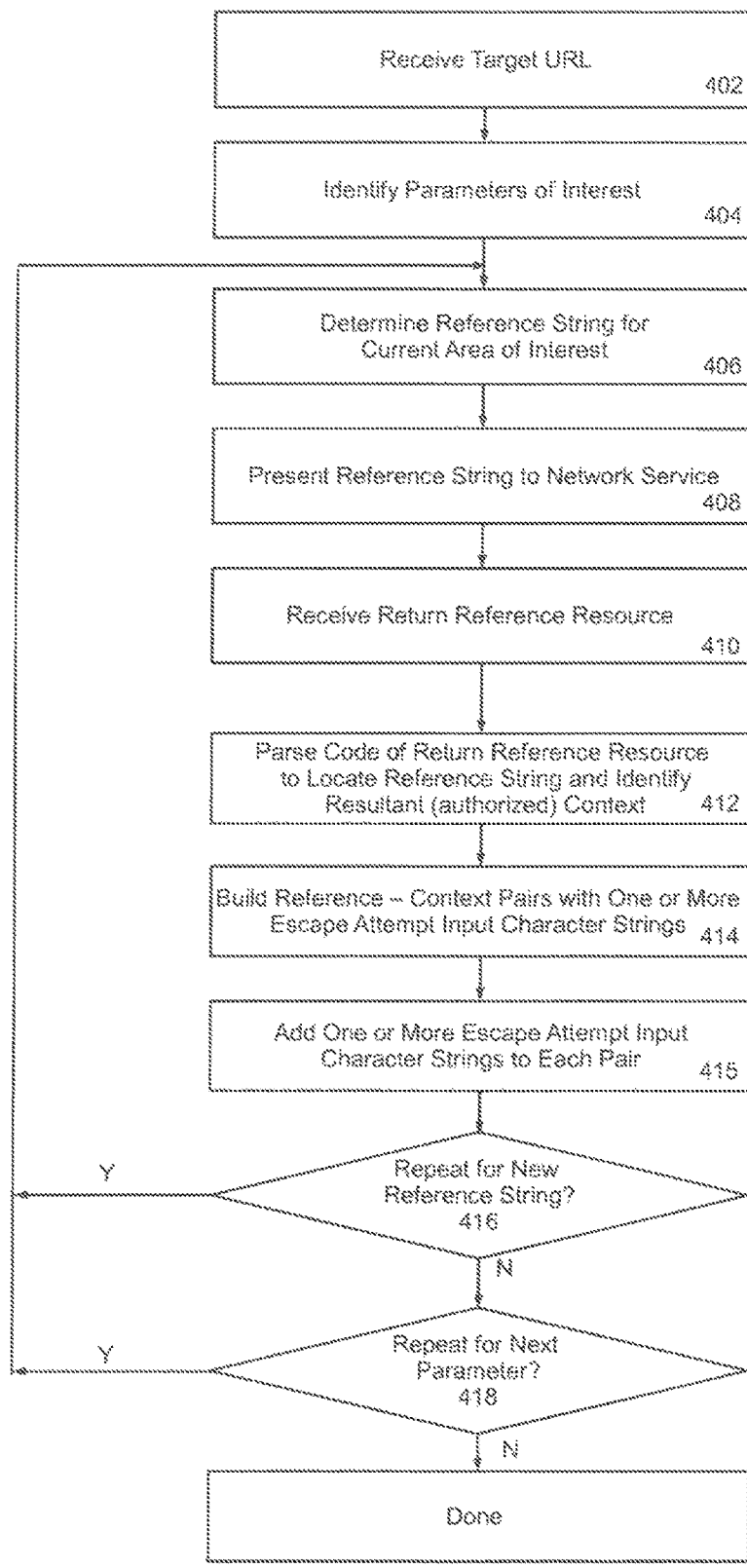
FIG. 4 is a flowchart illustrating a method for dynamically building a list of escape attempt inputs in order to analyze websites for vulnerabilities based on reference strings accordance with embodiments herein.

FIG. 4 is a flowchart illustrating a method for dynamically building a list of escape attempt inputs to be applied in order to analyze websites for vulnerabilities in accordance with embodiments herein. At 402, a target URL or set of URLs are identified for one or more webpage, website or Web application to be scanned for vulnerabilities by a vulnerability scanner. The web site comprises at least one web page that includes one or more parameters of interest that are configured to receive user inputs. The web pages are defined by code, such as HTML code, that comprises numerous elements that are designated by tags or attributes of tags (e.g., an event attribute), or otherwise.

The target URL may be directly and manually entered by a user into the vulnerability scanner, such as during development of a website. Alternatively, the vulnerability scanner may operate on a web proxy server and monitor traffic to/from one or more web servers. For example, the proxy server may represent a computer system or an application that acts as an intermediary for requests from client computers seeking resources from other servers. A client computer may connect to the proxy server, running the vulnerability scanner. The client computer requests some service, such as a file, connection, web page, or other available resource from a different server. The vulnerability scanner, running on the proxy server, passes the request to the appropriate server and waits for a return webpage. The vulnerability scanner may evaluate the return webpage, as explained herein, before or while passing the return webpage to the client computer.

At 404, the vulnerability scanner 120 (FIG. 2) identifies one or more parameters (e.g., input elements) of interest to be tested. The parameters of interest may represent various aspects of a webpage, website or Web application, and in general represent any aspect of a webpage, website or Web application susceptible to a third-party input injection attack. An input injection attack upon the web page may occur through various elements presented within the webpage (e.g. parameter of interest), including but not limited to a tag, attribute, or other control element. The parameter(s) of interest may be identified automatically by the vulnerability scanner, or may be entered by a user, such as a developer, designer or manager of websites and Web applications. As one example, a user may enter, at a client computer, a list of parameters of interest. As another example, a webpage may be displayed on a client computer and a user afforded a function to choose one or more features or areas on the webpage including or indicative of the parameters of interest.

At 406, the vulnerability scanner 120 determines one or more reference strings to be presented through the website to the parameter of interest. As a simple example, a parameter of interest may represent a user ID and/or password field, to gain access to a service provided on the Web server (e.g. a bank account, e-commerce account, etc.). In one embodiment, a reference string may be identified using a whitelist that identifies reference strings that have been safely used in the past in connection with known reference—contexts.

Optionally, the vulnerability scanner 120 may customize the definition of the parameters of interest and designate select tools that may be used to validate the parameters of interest. For example, the vulnerability scanner may define select character strings, character links and character types to be utilized with a select parameter of interest. Functional conditions may further be designated in connection with the character strings, such as indicating that a character string may be modified when certain conditions occur (e.g. "Must start with this string, but can be modified after").

At 408, the vulnerability scanner 120 begins probing the network service (e.g., website) by presenting one or more reference strings to the network service through the parameters of interest. The reference strings initially are constructed from "safe" strings that are expected to be correctly processed by the network service and not expose a vulnerability. Instead, the initial safe reference strings are configured to remain within the source context when returned with the return reference resource by the network service.

At 410, the vulnerability scanner 120 receives a return reference resource (e.g., webpage)(also referred to as a first response). The network server generates the return reference resource, at least in part, in response to the initial safe reference string.

At 412, vulnerability scanner 120 analyzes the return reference resource, for example by parsing through the code that defines the resource. For example, the parser module 208 (FIG. 2) may parse through HTML code, CSS code, scripts or any other code used to define or operate the webpage. Optionally, machine learning may be utilized to identify the resultant (authorized) context. The analysis at 412 identifies content within the return reference resource corresponding to the initial reference string. For example, the content may be similar or identical to the initial reference string. At 412, the analysis includes determining the context in which the reference string has been injected into the return reference resource. Continuing with the foregoing example, given that the initial reference string is constructed as a safe string, the reference string should be presented within a string context within the code defining the return reference resource. The context identified at 412 is classified and saved as the authorized context given that a safe reference string was used. Optionally, other processes may be used to classify a context as "authorized". For example, a list may be maintained of authorized context for corresponding input parameter available on the network resource. Optionally, a user may enter a designation of which context is authorized (e.g., when designating the parameter of interest).

At 414, a reference—context pair is generated/built by the scan management module 210 (FIG. 2) in connection with reference strings provided to the Web server. The reference—context pair includes the reference string, and the resultant context. At 415, the scan management module 210 identifies and saves, with the corresponding reference—context pair, a list of one or more characters and/or character sequences, scripts, images, etc. that are expected to escape from the reference (authorized) context to a different unauthorized context. Individual characters or character sequences or other entries in the list 231 represent an injection attack to be carried out upon the webpage. The characters and character sequences associated with individual injection attacks include one or more escape sequences that represent escape attempts to escape from or breakout of the authorized context. In one embodiment, the escape attempts may be identified using the database 230 of escape attempt character strings that have been successful in the past in connection with known reference strings. Optionally, machine learning may be utilized to identify escape attempt inputs to be used in connection with reference—context pairs.

The scan management module 210 identifies particular escape attempts based on the reference—context pair may be compared to an escape attempt (EA) database. The EA database may identify groups of EA inputs to be used with select authorized contexts. For example, when the authorized context is a string context, the EA database may indicate to use EA inputs with tags <script> and </script>. As another example, the EA database may indicate to use EA inputs with an image or attribute when the authorized context script is a string context.

Additionally or alternatively, the scan management module 210 may apply a rule or perform a select action to a reference string. For example, the reference string (e.g., "Jon" may be embedded in an image source, such as "img src=Jon.png". As another example, the reference string may be appended with leading or trailing characters. An attribute of the reference string may be modified, such as from string to script.

The EA inputs identified for an associated reference—context pair may be modified periodically based on various factors, such as the success rate of a particular EA input. For example, the EA database 231 may be updated to add an EA input when such EA input is found to be a risk, or to remove an EA input when the EA input is found to no longer be a risk. Additionally or alternatively, the rule(s) 237 applied to a reference string may be updated as new threats are found (e.g., when a new type of modification to a reference string is found to exploit a vulnerability).

The EA database 231 and/or rules 237 may be updated by a broad community of users, based on experiences by an individual web developer and/or e-commerce merchant and the like. The blacklist, EA database and/or rules may be based on the results determined in connection with the operations of FIG. 4 and/or FIG. 5.

At 416, the process determines whether to repeat the operations at 406-415 for an additional reference string in connection with the present parameter of interest. When additional reference strings are to be tested against the present parameter of interest, flow returns to 406. When no additional reference strings are to be tested against the present parameter of interest, flow moves to 418.

At 418, the process determines whether to repeat the operations of 406-415 in connection with an additional parameter of interest. When an additional parameter of interest is to be tested, flow returns to 406. Otherwise, the process is complete.

The operations at 406-415 are repeated to allow the vulnerability scanner to probe the target site at a defined rate and for a defined number of times. During individual iterations through the operations at 406-415, the return webpage is fetched utilizing likely-unique random reference strings for the parameter of interest. The operations at 406-415 enable the vulnerability scanner to build a map of reference—context pairs and a corresponding EA inputs. Next, the vulnerability scanner begins to probe the web page based on the list of EA inputs.

Figure 5:
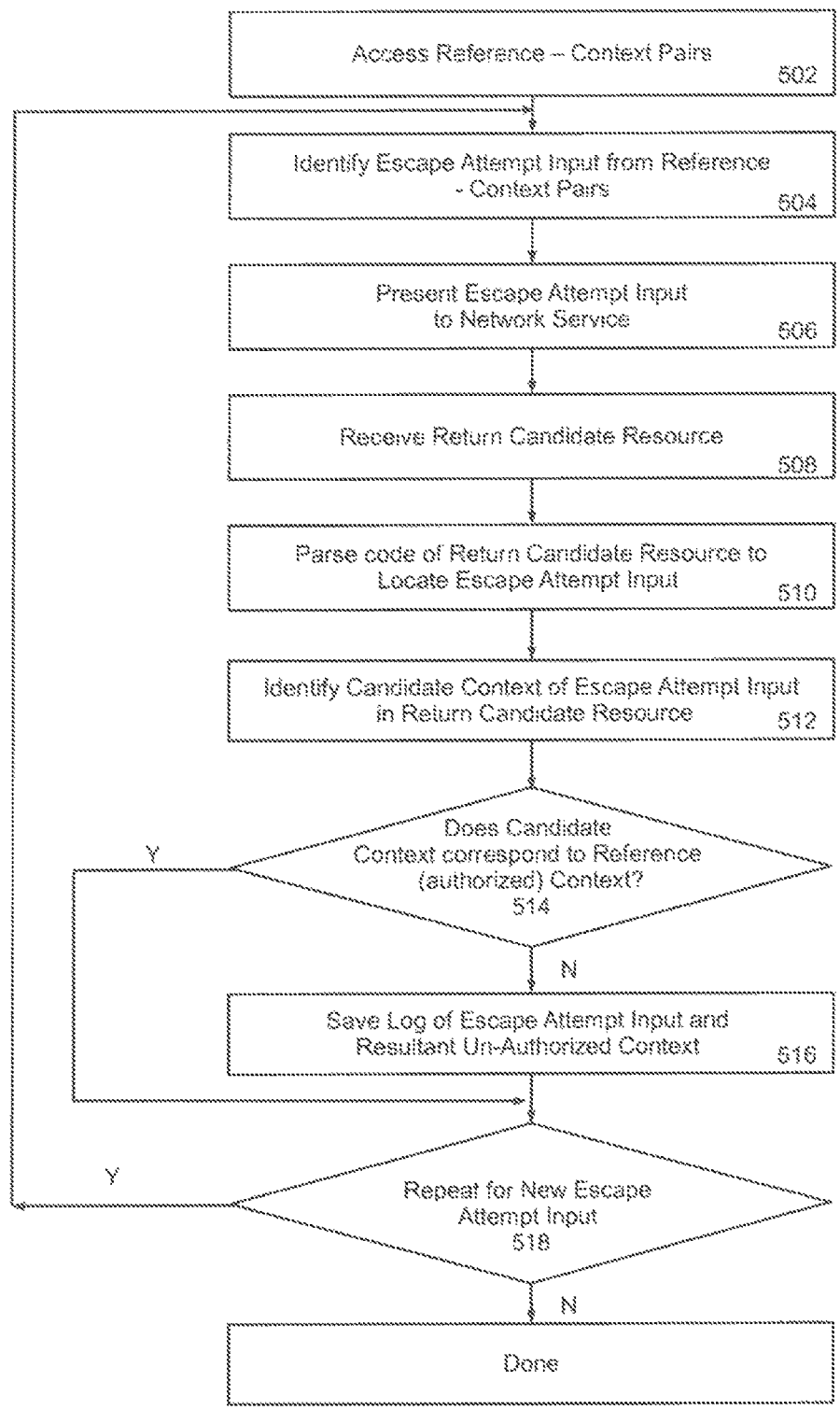
FIG. 5 is a flowchart illustrating a method for applying escape attempt inputs to websites in search of vulnerabilities in accordance with embodiments herein.

FIG. 5 is a flowchart illustrating a method for applying escape attempt inputs to a website in search of vulnerabilities. The operations of FIG. 5 may be performed in conjunction with the operations of FIG. 4. Alternatively, the operations of FIGS. 4 and 5 may be performed independently, with different frequency and at separate times. For example, it may be desirable to apply a list of escape attempt inputs to a website more frequently than building the reference—context pairs. Instead, a new map of reference—context pairs need not be created or updated before every vulnerability attack, in accordance with the operations of FIG. 5. Optionally, escape attempt inputs may be added to and removed from the map of reference—context pairs independent of the process of FIG. 4. For example, a website may be initially analyzed for vulnerabilities, and the reference—context pairs stored. Thereafter, the process need not apply the reference strings to the website again. The updates may simply involve adding and removing characters and character sequences from the list of potential escape attempt inputs in connection with one or more parameters of interest and/or the original reference—context pairs.

At 502, the vulnerability scanner accesses the map of reference—context pairs and lists or EA inputs. At 504, the vulnerability scanner identifies an escape attempt input to be used from the reference—context pairs. As noted above, the reference—context pair includes a list of one or more characters and/or character sequences that are expected to escape from an initial context to a different unauthorized context. The character or character sequence in the list represents an injection attack to be carried out upon the webpage. The different context into which a text input string may escape may vary in nature. As one example, text input strings may cross boundaries from a string context into a parsing context, as well as other contexts that are less significant, more-privileged, more-exploitable and the like, as compared to the original context in which the reference string originated. Optionally, a common set of characters or character sequences may be generated within the map for multiple reference-context pairs. When multiple reference—context pairs are assigned the same characters/sequences as an escape attempt, optionally the common characters and character sequences may be merged, such that a single character set or character sequence may be analyzed once for multiple reference—context pairs. It may be desirable to avoid repeated attacks with common escape attempt character sequences, in order to reduce the number of retries of the same characters/character sequence attempted with a single URL, and thereby avoid unduly burdensome in a Web server.

The reference and escape attempt strings may comprise any suitable character sets that are usable to verify whether the associated web page element is secure from attack or exploit. In one embodiment, the reference and escape attempt strings may include a custom attribute. For example, the custom attributes of the reference and escape attempt strings may represent a hash of one or more values generated using a hash function. By way of example, the reference string may represent a random input string, where the vulnerability analyzer identifies into which context the random input string has been inserted. The escape attempt input may be based on a reference string that is manipulated/changed multiple times (e.g. randomly or based on predetermined changes) in an attempt to break out and authorized context (e.g. a string context).

At 506, the escape attempt input is presented, through the corresponding parameter of interest, to the webpage. In response to an injection attack, the Web server generates a return candidate resource (e.g., webpage). At 508, the return candidate resource (also referred to as a second response) is received by the vulnerability scanner.

At 510, the parser module 208 (FIG. 2) parses through the code associated with the return candidate resource (in a manner similar to the operation described above). The parser module 208 searches for a return string that corresponds to the escape attempt input. At 512, when the return string (escape attempt input) is located, the scan management module 210 identifies the resultant (candidate) context in which the return string resides. Optionally, machine learning may be utilized to identify the un-authorized context.

Additionally or alternatively, at 510 and 512, the rendering module may render a returned candidate resource (e.g., webpage) and the rendering module 206, scan management module 210, and/or a user may review behavior of the rendered candidate resource. For example, a user may view content displayed or actions taken by the candidate resource. For example, a Java script alert may pop-up on the returned resource, or the rendered resource may attempt to access other network resources in a new manner (e.g., initiate a network connection). The displayed content and/or action taken may be automatically analyzed by the rendering module 206 and/or scan management module 210.

At 514, the scan management module 210 determines whether or not the return test string escaped from or broke out of the boundary of the authorized context and now resides in an unauthorized context. When the return test string resides in an unauthorized context, the scan management module 210 declares the occurrence of a vulnerability, and flow advances to 516. Otherwise, when the return test string remains within the authorized context, no vulnerability is declared and flow skips to 518.

At 516, the scan management module 210 saves, as an escape log entry (also referred to as a vulnerability item), the escape attempt input and the resultant unauthorized context in which the escape attempt was returned. Through multiple iterations through the operation at 516, an escape log is created that includes a list of potential vulnerability items. By way of example, the scan management module 210 may save, within a vulnerability item, the characters utilized in the escape attempt, the unauthorized context in which the escape attempt was returned as well as other relevant information. For example, the scan management module 210 may save, within the vulnerability item, information regarding a surrounding portion of the webpage in which the un-authorized context was presented, such as preceding and following portions of the code. In addition, the scan management module 210 may save the corresponding reference string and authorized context, in which the escape attempt input should have been returned.

At 518, it is determined whether additional escape attempt inputs to be tested, and if so, flow returns to 504. Otherwise the process ends. The operations at 504-518 are repeated for one or more escape attempt inputs in connection with the reference—context pair in order to apply multiple attacks upon the parameter of interest.

The examples provided herein are generally in the context of a reference string or EA input that is returned in a single context. However, it is to be understood that reference strings and EA inputs may be returned in multiple contexts throughout returned reference and candidate network resources. A returned candidate network resource may include one portion in which an EA input remains within an authorized context, while another portion of the returned candidate network resource includes the EA input escapes into an unauthorized context. The systems, modules and operations described herein identify and analyze the instance of a reference string or EA input as returned within a returning reference and candidate network resource. As one example, when a reference string is identified as returning within multiple contexts within a return reference network resource, the context may be processed separately as an individual target context. Additionally or alternatively, certain combinations of returned contexts may be recognized as overly susceptible to certain EA inputs and to have certain known corrective actions.

Once all escape attempt inputs are tested, the resultant escape log may represent a report identifying the successful context escape that was detected. The report may contain, among other things, the URL of the corresponding website and one or more parameters that were successfully attached. The report may also contain a description of why the context escape was successful, a description of the nature of the context escape (e.g. an explanation of potential dangers that may result when the reference string is permitted to breakout of the authorized context). Optionally, the vulnerability scanner may provide screenshots and video of the exploit in action from a tool. The report may also include comments and instructions regarding how to prevent the context escape. The report will also contain details of how to reproduce and verify the context escape, as well as how to verify the fix, and warnings against wrong fixes. Next, as explained in connection with FIG. 6, the log of context escapes is further analyzed to generate recommendations for sanitizing or otherwise removing vulnerabilities.

Figure 6:
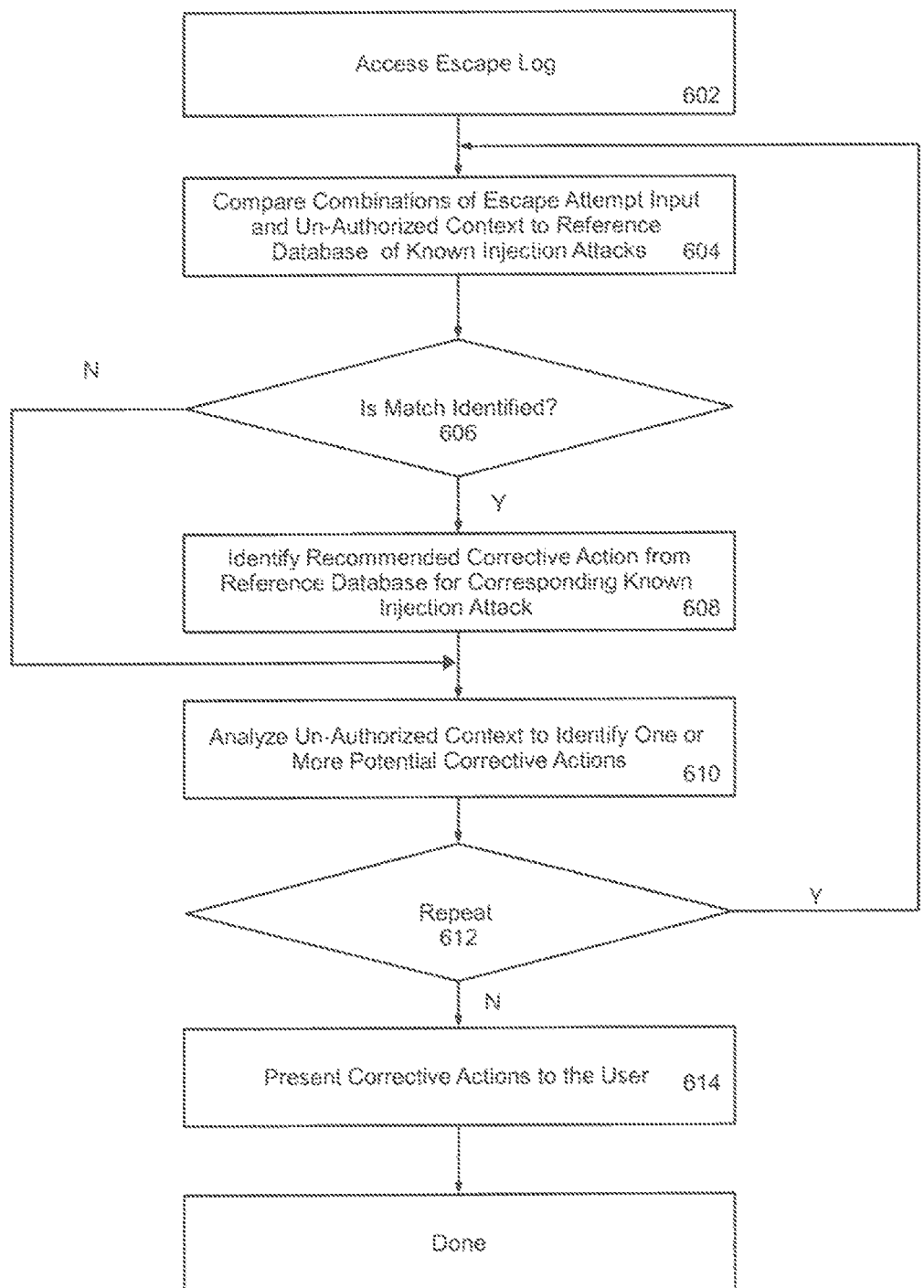
FIG. 6 is a flowchart illustrating a process for identifying potential corrective actions in connection with particular vulnerabilities in accordance with embodiments herein.

FIG. 6 is a flowchart illustrating a process for automatically or semi-automatically identifying potential corrective actions to take in connection with particular vulnerabilities. At 602, the recommendation module 212 (FIG. 2) accesses the escape log 263 (generated in connection with the operations of FIG. 5). As noted above, the escape log 263 includes a list of potential vulnerability items (e.g., the characters utilized in the escape attempt, the unauthorized context in which the escape attempt was returned as well as other relevant information, information regarding a surrounding portion of the webpage, etc.).

At 604, the recommendation module 212 compares a vulnerability item to known injection attacks within the reference solution database 265. The reference solution database 265 includes known injection attacks associated with one or more corrective actions. The reference solution database 265 may simply include, as the injection attacks, a list of character strings that are known to escape from various context. As another example, the reference solution database 265 may include a list of character strings and corresponding context in which such character strings are returned by network service, where the combinations of character strings and contexts are associated with corrective actions. As another example, the reference solution database 265 may include a list of combinations of authorized and un-authorized contexts, without particular character strings that escape from the authorized context into the unauthorized context, where the combinations have associated stored corrective actions.

The reference solution database 265 may maintain a running log of any and all reported or expected injection attacks. For example, the reference solution database 265 may be built and updated in connection with maintaining websites for financial institutions that experience various types of attacks and identify corresponding vulnerabilities, as well as solutions. The reference solution database may be maintained by, or obtained from, e-commerce providers, standards bodies, security management services, web developers and the like.

At 606, the recommendation module 212 determines whether the reference solution database 265 includes an entry (known injection attack) that matches the vulnerability item. For example, it may be determined whether the reference solution database 265 includes a character string-context combination matching the escape attempt input and the associated resulting unauthorized context. As another example, it may be determined whether the present vulnerability item includes an authorized/un-authorized context combination that matches an authorized/un-authorized context combination in the reference solution database 265 that has been known in the past to present vulnerabilities. Optionally, the reference solution database 265 may contain other types of information related to vulnerabilities that is compared with the content of the vulnerability items in the escape log. When a match is identified at 606, flow advances to 608. Otherwise flow advances to 610.

At 608, the recommendation module 212 identifies a recommended corrective action from the reference solution database 265 for the corresponding known injection attack. Various types of corrective actions may be saved in the reference solution database. For example, the recommendation module 212 may access the reference solution database 261 and review the list of known injection attacks 265 to determine whether a recommended corrective action is stored in the reference solution database 261 in connection with the escape attempt input identified.

At 610, the recommendation module 212 may further analyze the vulnerability item to identify one or more other potential corrective actions. For example, at 610, the recommendation module 212 may analyze the code of the webpage surrounding the returned escape attempt. Based upon the content of the surrounding code, the recommendation module 212 may derive additional corrective actions for recommendation to the user. As another example, the recommendation module 212 may maintain a user generated list and/or predetermined list of corrective action based on the nature of the escape. For example, when an escape attempt successfully breaks out of a string context into a parsing context, the recommendation module 212 may present one or more corresponding predetermined corrective actions to the user.

Additionally or alternatively, the analysis at 412-415 (FIG. 4) and 604-610 in FIG. 6) may utilize multiple different parser modules (collectively within the parser module 208 in FIG. 2), with the parser modules tailored to analyze certain aspects of the return network resource, such as certain types of HTML source code. The parsers are configured to determine the HTML source code that generates a particular segment of the network resource. Once the type or nature of the HTML source code is determined, a more tailored corrective action may be identified at 610. For example, based on the HTML source code, different escape libraries may be accessed, where a select escape library is better tailored to address certain types of vulnerabilities. As another example, based on the HTML source code, different patches may be applied to correct or sanitize a vulnerability.

Additionally or alternatively, an image of various information concerning a vulnerability, such as the HTML source code, identified vulnerability, threat information and the like, may be conveyed to an expert at an expert workstation who views the vulnerability information on an expert user interface to identify and provide recommended corrective actions. As one example, the expert may utilize a known set of corrective actions associated with particular context or vulnerabilities. The expert's user interface would generate an image of the HTML source code, returned webpage and other vulnerability information. The expert compares the HTML source code and other vulnerability information against a known set of suggestions and returns a recommendation from the set of suggestions. Additionally or alternatively, the actions described above by the expert may be performed automatically by the recommendation module 212 (FIG. 2). For example, the expert or recommendation module 212 may determine that a returned escape attempt is in a particular context and that certain actions have occurred at the network service, in response to which a corresponding suggestion is returned. When the vulnerability may be tied to particular HTML source code, even more specific suggestions may be returned from the set of suggestions (e.g., when in context X and escaping in manner Y, corrective actions Z should be taken). Optionally, experts may take particular injection attacks off-line to analyze further to identify potential corrective actions At 612, the recommendation module 212 determines whether the operations at 604-610 should be repeated for additional vulnerability items in the escape log. When additional vulnerability items exist in the escape log, flow returns to 604. Otherwise, flow advances to 614.

At 614, the recommendation module 212 presents a vulnerability report on the display of the client computing device 160. The vulnerability report may include, among other things, one or more corrective actions recommended for the user to take in connection with sanitizing the vulnerability.

In accordance with embodiments herein, methods, systems and computer program products are provided that utilize a safe reference string to determine authorized resultant context, from which injection attacks may be deduced. In accordance with embodiments herein, the injection attacks are then attempted and, when successful, use to generate problem-solution information for the user to facilitate debugging of the webpage.

Illustrative Computer System

Figure 7:
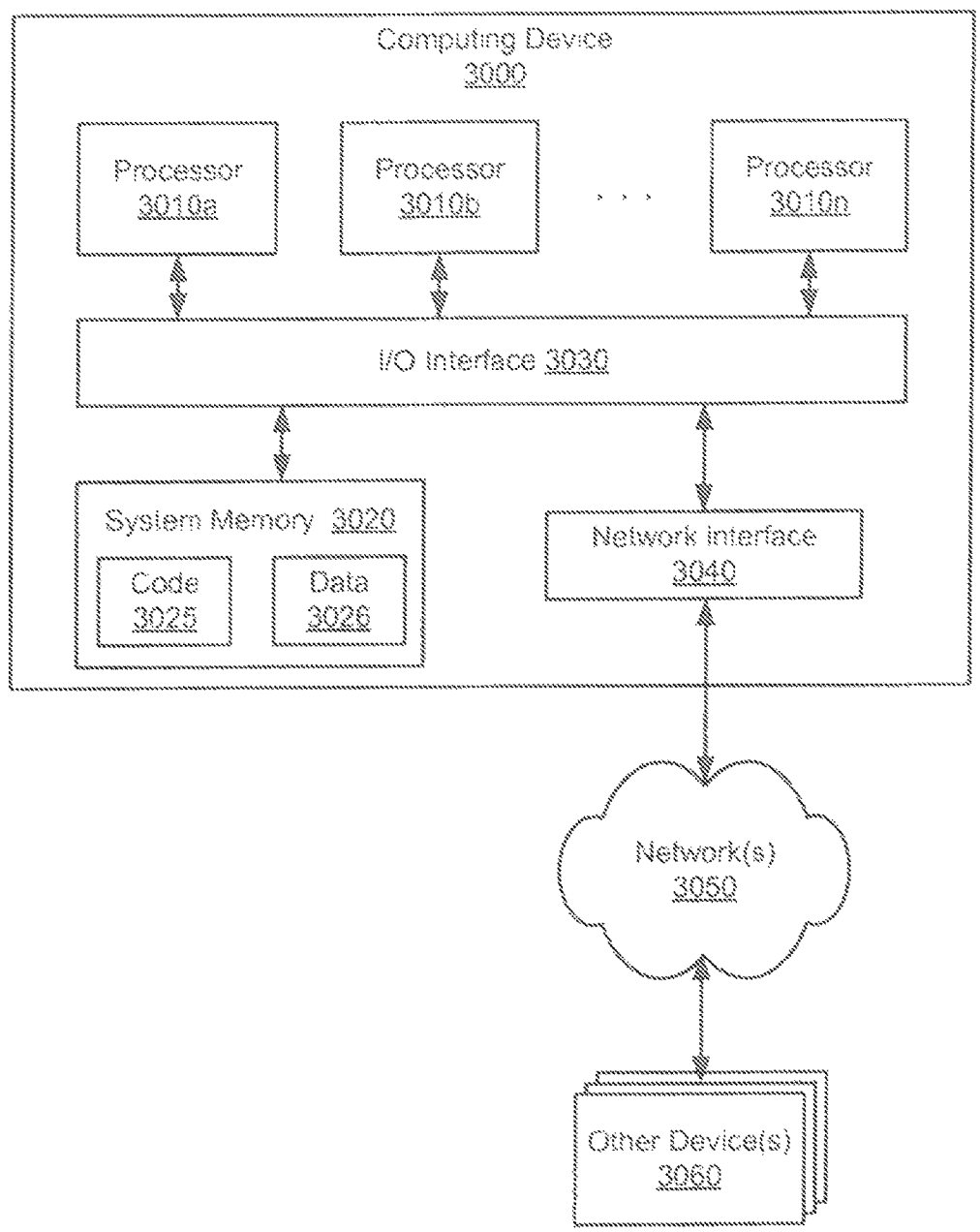
FIG. 7 illustrates a computer system that implements a portion or all of one or more of the technologies described herein, such as the vulnerability scanner, in accordance with embodiments herein.

In at least some embodiments, a computer system that implements a portion or all of one or more of the technologies described herein, such as the development system 100, may include a general-purpose computer system that includes or is configured to access one or more computer-readable media. FIG. 7 illustrates such a general-purpose computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be general-purpose or embedded processors implementing any of a variety of instruction set architectures (ISAs), such as the x86, PowerPC, SPARC, or MIPS ISAs, or any other suitable ISA. In multiprocessor systems, the processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050, such as other computer systems or devices as illustrated in FIGS. 1-6, for example. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for FIGS. 1 through 6 for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A computer implemented method executable on a hardware processor, comprising:
   identifying a reference string in a first response and a first context in which the reference string appears, wherein the first response is generated by a network service at least in part based on the reference string, wherein the reference string represents a safe character string that is expected to remain within the first context;
   determining an escape attempt input from an escape attempt database based at least in part on the reference string and first context;
   identifying the escape attempt input in a second response and a candidate context in which the escape attempt input appears, wherein the second response is generated by the network service at least in part based on the escape attempt input; and
   determining that the candidate context in which the escape attempt input appears is a second context that differs from the first context, wherein the escape attempt input represents a character string that is expected to escape from the first context into the second context.

2. The method of claim 1, further comprising determining that a vulnerability exists in the network service when the escape attempt input escapes from the first context.

3. The method of claim 1, wherein the escape attempt input is identified based on past escape attempt inputs that were successful or unsuccessful in escaping from the first context.

4. The method of claim 1, further comprising:
   generating reference-context pairs in connection with a plurality of the reference strings and corresponding first contexts in which the reference strings appear; and
   building a map containing a list of the reference-context pairs and character sets representing escape attempt inputs to be presented to the network service.

5. The method of claim 1, wherein at least the second response includes a script element formed by the network service in response to the escape attempt input, the script element representing the second context.

6. The method of claim 1, wherein the first context represents a string context interleaved within parsing contexts, and the second context represents the parsing context.

7. The method of claim 1, further comprising presenting the escape attempt input to the network service.

8. The method of claim 1, wherein the network service represents a web server and the first and second responses represent reference and candidate returned webpages.

9. A system, comprising:
   at least one hardware processor; and
   a memory coupled to the at least one hardware processor, wherein the memory stores program instructions, wherein the program instructions are executable by the at least one hardware processor to:
   identify a reference string in a first response and a first context in which the reference string appears, wherein the first response is generated by a network service at least in part based on the reference string, wherein the reference string represents a safe character string that is expected to remain within the first context;
   determine an escape attempt input from an escape attempt database based at least in part on the reference string and first context;
   present the escape attempt input to the network service;
   identify the escape attempt input in a second response and a candidate context in which the escape attempt input appears, wherein the second response is generated by a network service at least in part based on the escape attempt input; and
   determine that the candidate context in which the escape attempt input appears is a second context that differs from the first context, wherein the escape attempt input represents a character string that is expected to escape from the first context into the second context.

10. The system of claim 9, wherein the program instructions are executed by the at least one hardware processor to identify a recommended corrective action from a solution reference database of known injection attacks.

11. The system of claim 9, further comprising a data store storing an escape log that includes at least one vulnerability item corresponding to the escape attempt input that has broken out of the first response and appears in the second context in the second response.

12. The system of claim 9, further comprising a data store storing vulnerability items corresponding to escape attempt inputs that were determined to escape from the first context, the program instructions executable by the at least one hardware processor to analyze the vulnerability items in connection with determining corrective actions.

13. The system of claim 9, further comprising a user interface that includes a code region to present at least a portion of source code defining the second response, and a region presenting a list of at least one vulnerability item identified based on the determining operation.

14. The system of claim 9, further comprising a data store that includes the escape attempt database that stores a list of contexts that may be utilized in connection with the network service, the contexts having one or more candidate escape attempt inputs stored in connection there with, the hardware processor determining the escape attempt input to be presented to the network service based on the list of contexts in the escape attempt database.

15. The system of claim 9, wherein the first context represents a string context interleaved within parsing contexts, and the second context represents the parsing context.

16. The system of claim 9, wherein the network service represents a web server and the first and second responses represent first and second returned webpages.

* * * * *